United States Patent
Lebost

(10) Patent No.: US 8,181,384 B2
(45) Date of Patent: May 22, 2012

(54) DEVICE FOR INTERRUPTING A MOSQUITOS GESTATION CYCLE

(76) Inventor: Barry Lebost, Hastings-on-Hudson, NY (US)

( * ) Notice: Subject to any disclaimer, the term of this patent is extended or adjusted under 35 U.S.C. 154(b) by 426 days.

(21) Appl. No.: 12/104,090

(22) Filed: Apr. 16, 2008

(65) Prior Publication Data
US 2009/0260277 A1    Oct. 22, 2009

(51) Int. Cl.
*A01M 1/10* (2006.01)
*A01M 1/14* (2006.01)

(52) U.S. Cl. .................... 43/107; 43/114; 43/121

(58) Field of Classification Search ............ 43/107, 43/114–117, 121; *A01M 1/10, 1/14*
See application file for complete search history.

(56) References Cited

U.S. PATENT DOCUMENTS

| | | | |
|---|---|---|---|
| 887,256 A * | 5/1908 | Teutsch | 356/142 |
| 1,936,644 A * | 11/1933 | Schroder | 43/121 |
| 3,997,999 A * | 12/1976 | Evans | 43/107 |
| 4,310,985 A * | 1/1982 | Foster et al. | 43/131 |
| 4,908,977 A * | 3/1990 | Foster | 43/107 |
| 5,849,262 A * | 12/1998 | Thomas et al. | 424/9.1 |
| 5,983,557 A * | 11/1999 | Perich et al. | 43/107 |
| 6,158,166 A * | 12/2000 | Snell et al. | 43/131 |
| 6,393,759 B1 * | 5/2002 | Brown et al. | 43/113 |
| 6,609,526 B2 * | 8/2003 | Yuhara | 132/307 |
| 6,772,556 B1 * | 8/2004 | Liu | 43/107 |
| 7,694,455 B1 * | 4/2010 | Bowden et al. | 43/107 |
| 2003/0217503 A1 * | 11/2003 | Robison | 43/114 |
| 2004/0128903 A1 * | 7/2004 | Wexler | 43/122 |
| 2004/0216366 A1 * | 11/2004 | Ritchie et al. | 43/114 |
| 2006/0090391 A1 * | 5/2006 | Huang | 43/107 |
| 2006/0225343 A1 * | 10/2006 | Thoele | 47/41.11 |
| 2010/0024278 A1 * | 2/2010 | Simchoni-Barak et al. | 43/113 |

OTHER PUBLICATIONS

Ordonez-Gonzalez et al., "The Use of Sticky Ovitraps to Estimate Dispersal of Aedes Aegypti in Northeastern Mexico," Jun. 2001, Journal of the American Mosquito Control Association, pp. 93-97.*

* cited by examiner

*Primary Examiner* — David Parsley
*Assistant Examiner* — Marisa Conlon
(74) *Attorney, Agent, or Firm* — Lackenbach Siegel LLP; Myron Greenspan

(57) ABSTRACT

A device for interrupting the gestating cycle of a mosquito includes a container having a bottom wall and side walls. A generally porous sheet of material is placed over the upper opening thus formed in the container by securing it to the periphery of the container. Double sided tape, mechanical clips, etc. may be used to attach the porous material to the periphery of the container to cover the open area. The porous sheet of material is farametis and contains apertures that are small enough to prevent an adult mosquito from passing through it but yet allow evaporation of water placed into the container and water molecules through the apertures. A sticky substance is placed on the outer surface of the porous sheet. Water is evaporated from the container and water molecules are released through the apertures into the atmosphere above the porous sheet. Gestating mosquito's are attracted to the device and attempt to enter the container to lay there eggs in the water within the container but can not. Instead, the mosquitoes are immobilized on the surface of the porous material when retained by contact with a sticky substance and prevent it from laying eggs in the container or any other body of water. This breaks the reproductive cycle of the mosquito.

20 Claims, 2 Drawing Sheets

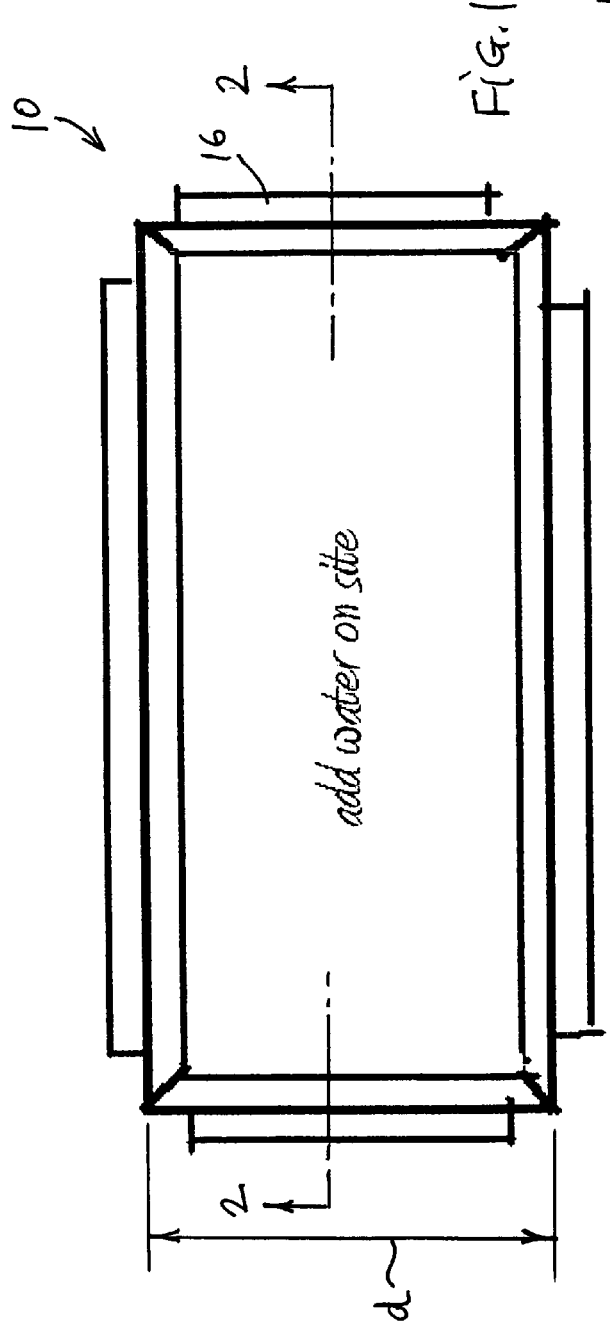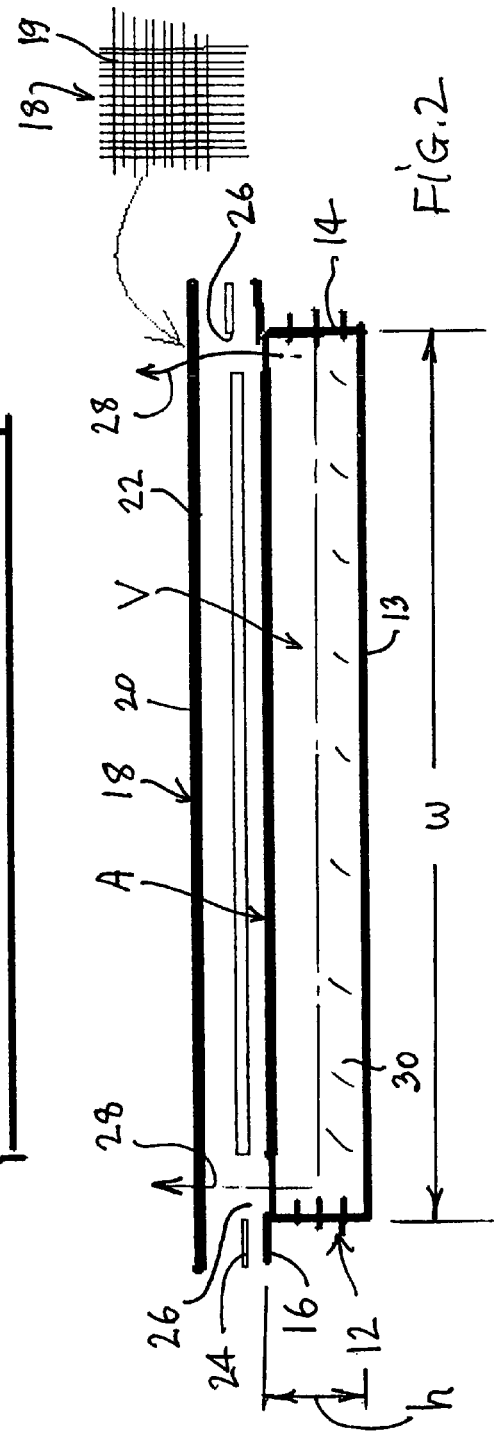

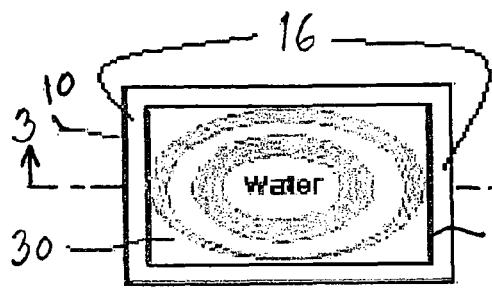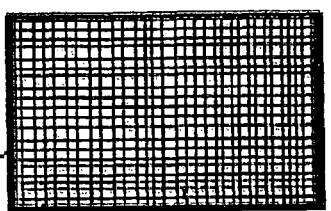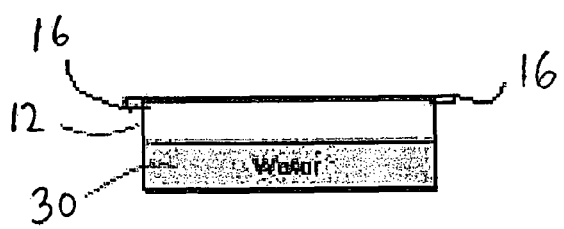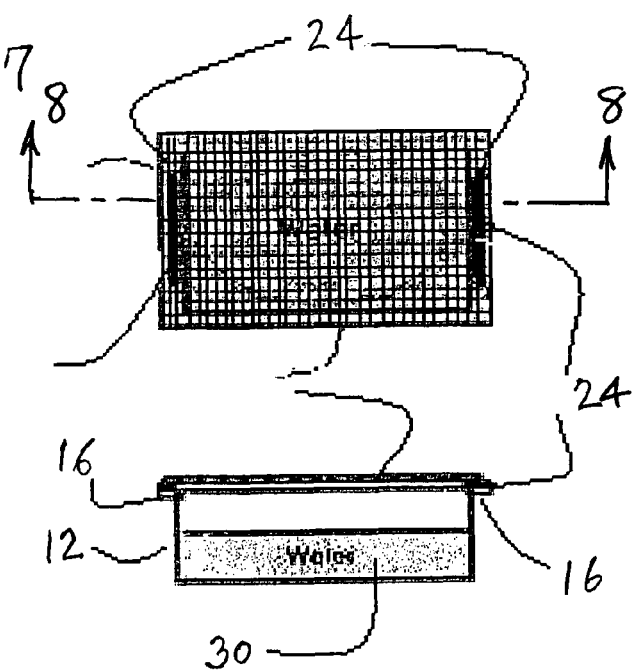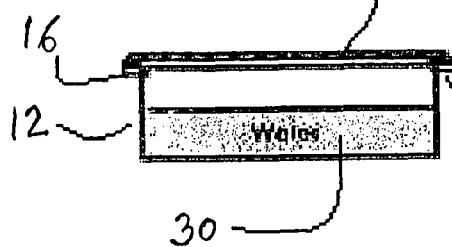

DEVICE FOR INTERRUPTING A MOSQUITOS GESTATION CYCLE

BACKGROUND OF THE INVENTION

1. Field of the Invention

This device generally relates to insect control devices and, more specifically, to a device for interrupting the gestation cycle of mosquito's.

2. Description of the Prior Art

Crawling and flying insects have long been a problem to human beings and animals. While most of these insects are only an irritation that detract from being outdoors, many insects can and do provide serious health risks. Thus, many insects, such as mosquitoes, carry and breed various disease-producing organisms. Thus, some mosquitoes like to feed from birds and other species like to feed from animals, including people. The female mosquito is more problematic than the male. Aside from the fact that the female is responsible for laying eggs, a female mosquito can live up to three weeks during the summer and will feed on blood more than once. When this happens, the female mosquito has the potential to transmit blood-born diseases from one animal or person to another. Throughout history, mosquitoes have been a source of major medical epidemics including Malaria, Yellow Fever and West Nile Virus which is spread by mosquitoes that have fed on the blood of infected birds. Other diseases that mosquitoes have promoted include Dengue Fever and Saint Louis Encephalitis.

The best defense to being bitten by mosquitoes is prevention and protection. Thus, when going outdoors, certain repellents are recommended that contain DEET or other approved ingredients that repel mosquitoes. However, also effective is the elimination of mosquito breeding sites. Since mosquitoes lay eggs in standing water and it takes approximately four days for the eggs hatch and to grow into adults that are ready to fly, even a small amount of water, for example, in a saucer under a flower pot is enough to act as a breeding ground. As a result it is important to eliminate as much standing water around a property as possible.

Mosquitoes get their start in water. The female can lay a hundred to four hundred eggs directly on the water surface and they are likely to hatch within twenty-four hours. Mosquito larva gestate beneath the surface of even the smallest amount of water. When conditions are right the entire cycle from egg to adult can be completed in less than ten days.

On the basis of the experience in the Panama Canal, where thousands of fatalities resulted from Malaria, the physicians were aware that Malaria was caused by the anopheles mosquito and the life cycle of the mosquito were understood as well. One of the steps taken at that time was to discourage reproduction by mosquitoes by placing oil in every pool of water that was found. The efforts to interrupt the breeding cycle of the mosquito almost completely eliminated the risk of Malaria to the construction teams. Yet, although efforts to stop the spread of Malaria commenced almost two hundred years ago Malaria has not yet been totally eradicated. It is said that over a million children die of Malaria every year.

Attempts have been made to impregnate mosquito nets with insecticide. These nets are hung over people's beds at night because the anopheles mosquito prefers to bite at night. Mosquitoes nets, however, can cost in excess of $5.00 each—a price that is steep for many individuals in developing countries to pay. Consequently, it is the health organizations that deliver such blankets that are relied upon for mosquito protection.

It should be clear, therefore, that two primary efforts can be made to prevent mosquitoes from biting. Either barriers can be used that cover and protect individuals or the number of mosquitoes can be reduced by interrupting their gestation cycle and, therefore, the hatching of many eggs that would otherwise become adult biting mosquitoes.

Because mosquitoes gestate beneath the surface of a body of water, however small, female mosquitoes about to lay eggs sense water molecules that evaporate from a body of water and are attracted to the body of water. When such a mosquito encounters the body of water it lays the eggs on the surface of the water.

Thus, while numerous devices have been proposed to prevent or interfere with a mosquito's activities in biting humans many of these procedures have been either inconvenient, costly or ineffective.

SUMMARY OF THE INVENTION

It is, therefore, an object of the invention to provide a device for dealing with flying insects, in particular mosquitoes that does not have the disadvantages inherent in prior art devices.

It is still another object of the invention to provide a device for interrupting the gestation cycle of mosquitoes.

It is still another object of the invention to provide a device as in the last object that is simple in construction and economical to manufacture.

It is yet another object of the invention to provide a device as in the previous objects that is extremely effective in eliminating mosquitoes that are about to lay eggs.

It is a further object of the invention to provide a device of the type under discussion that is simple and convenient to use.

In order to achieve the objects of the invention, as well as others which will become evident hereinafter, a device for interrupting the gestation cycle of mosquitoes includes a container having a bottom wall and side walls defining an internal volume for receiving water. Said side walls define an upper open area and a generally continuous periphery. A generally porous sheet of material is provided that is at least as large as said open area. Attaching means, such as double sided tape, is used for attaching said porous sheet of material to said container along said periphery to cover said open area. Said porous sheet defines an outer surface when attached to said container along said periphery having at least a plurality of apertures dimensioned to prevent an adult mosquito from passing therethrough but allowing evaporation of water placed into said container and passage of water molecules through said plurality of apertures. A sticky substance is provided on said outer surface of said porous sheet. In this manner, evaporation of water placed within said container releases water molecules through said apertures into the atmosphere above said porous sheet to attract gestating mosquitoes that attempt to enter said container to lay their eggs in the water therein and are immobilized when retained by contact with said sticky substance and prevented from laying eggs in the water in said container, or any other body of water, thereby breaking the reproductive cycle of the mosquito.

BRIEF DESCRIPTION OF THE DRAWINGS

The above and other objects, features and advantages of the present invention will be better understood from the following specification when read in conjunction with the accompanying drawings.

FIG. 1 is a top plan view of a device for interrupting the gestation cycle of mosquitoes in accordance with the present invention;

FIG. 2 is a cross-sectional view of the device shown in FIG. 1, taken along line 2-2, and showing a detail of the net or mesh screen used to close an upper open area of the container;

FIG. 3 is the top plan view of another embodiment of the device in accordance with the invention, with the top mesh or covering material removed;

FIG. 4 is a cross-section of the device shown in FIG. 3, taken along line 3-3;

FIG. 5 is a top plan view of the mesh or screen used to cover the container shown in FIG. 3;

FIG. 6 is a side elevational view of the mesh or screen shown in FIG. 5;

FIG. 7 is similar to FIG. 5, but showing the mesh of FIG. 5 attached and secured to the container shown in FIG. 3 by means of suitable attaching members; and FIG. 8 is a cross-sectional view of the device shown in FIG. 7, taken along line 8-8.

DESCRIPTION OF THE PREFERRED EMBODIMENTS

Referring now specifically to the figures, in which the identical or similar parts would be designated by the same reference numerals throughout, and first referring to FIGS. 1 and 2, a device for interrupting the gestation cycle of a mosquito in accordance with the invention is generally designated by the reference numeral 10.

The device 10 includes a container 12 having a bottom wall 13 and side or upright walls 14 that together define an internal volume "V" for receiving water. The side walls 14 define an upper open area "A" and a generally continuous periphery "P".

While the specific configuration of the container 12 is not critical, it is preferably a shallow, rectangular box as shown having a construction that permits it to be assembled in the field or by the customer from a generally flat configuration or blank. Numerous box constructions of this type will come to mind and will be known to those skilled in the art. The specific manner in which the box is made and assembled from a blank is not critical for purposes of the present invention and any such relatively shallow box that can be initially collapsed and ultimately expanded or opened to a state as shown in FIGS. 1 and 2 can be used.

An important feature of the invention is that the container 12 be capable of receiving and retaining a quantity of water for an extended period of time. Therefore, the box 12 should be made from a water impermeable material, such as wax coated paper or cardboard, plastic or the like.

In the presently preferred embodiment shown in FIGS. 1 and 2, the container 12 preferably has a height "h" between the bottom wall 13 and the open area A which is less than the dimensions "w" or "d" of the bottom wall. This provides a large open area A in order to enhance or increase the rate or speed of water evaporation. In the presently preferred embodiment, the container 12 is rectangular as shown and has a height "h" less than half the dimensions of either "w" or "d" of the bottom wall 13.

As indicated, the container is preferably made from a material that is water impermeable and can, therefore, retain water placed therein for extended periods of time to allow evaporation of the water through the porous sheet. Any material that is water impervious can be used, including plastic, wax-coated paper or cardboard or the like.

At least one of the side or upright walls 14 is preferably provided with a flange or lip generally parallel to the bottom wall 13 for cooperating with means for attaching the porous sheet to the container, typically after water has been poured into the container in the field. In the presently preferred embodiment, the flange or lip 16 extends substantially about the entire periphery P to create an upwardly facing surface S that facilitates the attachment of a porous sheet 18 to the container. The porous sheet 18 itself can be made of a number of different materials. However, an important feature of the porous sheet of material is that it be provided with at least a plurality of apertures 19 dimensioned to prevent an adult mosquito from passing through such apertures yet allowing evaporation of water placed into the container and passage of water molecules through the plurality of apertures. In the presently preferred embodiment, the porous sheet 18 is formed as a sheet of foraminous material in order to increase the surface area through which water may evaporate. The sheet of material 18 may, for example, be a porous screen, a porous cloth, a wire mesh, a metal grill of the like.

Referring to FIG. 2, the screen 18 is shown about to be attached to the surface S of the tab or rim 16 by means of double sided tape 24. When a sheet of double sided tape is used, suitable openings 26 may be used to allow water vapor to escape from the container 12, through the openings 26 and ultimately through the porous sheet of material 18. Such movement of the water molecules is designated by the arrows 28.

An important feature of the invention is the provision of a sticky substance on the outer surface 20 of the screen 18. The sticky substance 22 must have the property that it has sufficient retaining adhesion so that when a mosquito sets on and contacts such sticky substance it can not extricate itself from the sticky surface and remains bound to it. The specific sticky substance used is not critical for purposes of the invention. However, some examples of sticky substances that can be used includes mussel-mimetic polymers, sticky tape, insect tape or the like. The adhesive strength of such sticky substance should be at least equal to 50 kPa.

In this manner, it will be evident that evaporation of the water 30 placed within the container 12 releases water molecules through the apertures 19 into the atmosphere above the porous sheet of material to attract gestating mosquitoes that attempt to enter the container to lay eggs in the water therein. Such mosquitoes, upon contact with the sticky substance 22, are immobilized and prevented from laying eggs in the water in the container 12 or any other body of water since the mosquito can not set itself apart from the sticky substance. This effectively breaks the reproductive cycle of the mosquito since the mosquito can no longer lay its eggs in any body of water.

In order to serve effectively, the container is preferably the shape of a shallow rectangular box as described.

It is presently preferred that the container 12 be part of a kit that also includes means for preventing premature attachment of the porous sheet 18 to the container 12, and assembly and use instructions. In this way, the kit can be sold to consumers who simply assemble it, fill it with water and attach the screen by any suitable means. While double sided tape has been shown, any other means can be used for attaching the screen 18 to the tab or rim 16 as shown and described. When sold as a kit, the kit includes the container or reservoir to hold waters water's and means to attract gestating mosquitoes. The reservoir or container can be made of plastic or thin gage metal and sized for convenient purchase and use. Attachment members may also be provided to attach a mesh cover to the reservoir. The specific method of attaching the mesh cover to the reservoir is not critical, although double sided tape, adhesive, and mechanical means may be used. One example of a mechanical means that can be used is a spring loaded clip that engages both the flange as well as the porous sheet of material such as a paper clip. The kit also includes a mesh net or screen cover coated with a sticky substance as described. The mesh is preferably slightly larger than a reservoir when its tabs are extended. The mesh has approximately ¼ inch holes and can be made of plastic, metal, paper, bamboo, wood and possibly glass such as fiber glass. The mesh preferably is provided with clear plastic or paper protection strips that peel off to expose the adhesive for attaching the mesh to the container about its periphery. The mesh has glue applied to the exposed side. The kit provides a waxed paper or plastic to protect the user by keeping the glue on the mesh in a contained area. The kit comes with single use plastic gloves as this glue may not come off the skin easily. All components used in a plastic bag with a label and instructions for use in several languages is also preferably provided.

It has been found that the device in accordance with the invention can cost well below $5.00 each to consumers, and at a price that may be viable to people in developing Countries. It is presently estimated that such a kit in accordance with the invention can be made to sell at less than $1.00 US or approximately 20% of the price of a mosquito net which has up to now been used in many Countries, such as in Africa and Asia.

With the device of the invention, if a gestating anopheles mosquito is killed and prevented from landing in a body of water any of its two hundred offspring that could be destined to contract or spread Malaria, for example, will now never exist. In addition to this, if an anopheles mosquito should bite a person with Malaria the device of the invention will become immediately effective to stop the progression of the disease. Thus, the device in accordance with the present invention eliminates generations of mosquitoes that would have carried the disease.

The device of the invention has been tested in Costa Rica. For the container, one pan of water, pie sized, was used. For a small house 1500 square feet inhabited by three people a unit was placed in the corners of the room. The following number of catches attached to the screen under different weather conditions, is set forth below.

| Day | Date | Total Number // Daily Catches on Screen | Weather Conditions |
| --- | --- | --- | --- |
| 1 | Friday, Dec. 21, 2007 | 0 // 0 | Clear |
| 2 | Saturday, Dec. 22, 2007 | 0 // 0 | Clear |
| 3 | Sunday, Dec. 23, 2007 | 1 // 1 | Cloudy |
| 4 | Monday, Dec. 24, 2007 | 5 // 4 | Cloudy/rain |
| 5 | Tuesday, Dec. 25, 2007 | 10 // 5 | Cloudy/rain |
| 6 | Wednesday, Dec. 26, 2007 | 10 // 0 | Sunny |
| 7 | Thursday, Dec. 27, 2007 | 12 // 2 | Rain/sunny |
| 8 | Friday, Dec. 28, 2007 | 12 // 0 | Sunny/cloudy |

Thus, after eight days 12 gestating mosquitoes were prevented from hatching their eggs, preventing as many as 500 mosquitoes from being released each of which can potentially spread disease. It is also noted that more mosquitoes were caught after rain—a common weather pattern in tropical climates.

It will be clear, therefore, that the present invention does not serve to merely prevent a mosquito from biting a human or an animal. Instead, the device is intended to interrupt the gestation cycle of mosquitoes by preventing them from laying their eggs in their natural environment or in a pool of standing water. In this way, the device serves not only to eliminate or trap one mosquito at a time, typical for other prior art devices, but also for preventing, for each gestating mosquito, hundreds and hundreds of mosquitoes from being hatched.

While the invention has been shown and described in connection with a preferred form of an embodiment it will be understood that modifications may be made without the departure from the scope or spirit of the invention.

The invention claimed is:

1. A device for interrupting the gestation cycle of mosquitoes consisting of:
   a substantially waterproof and leak-proof container having a predetermined periphery defining a predetermined simply connected area within a horizontal plane when said container is placed on a horizontal surface, said container having a substantially uniform cross-section along a vertical axis corresponding to said predetermined simply connected area, a bottom wall and a side wall defining an internal volume for receiving and retaining water, said side wall defining a predetermined upper open area defined by said periphery substantially corresponding to said simply connected cross-sectional area;
   a generally porous sheet of material at least as large as said predetermined open area;
   attaching means for attaching said porous sheet to said container to entirely cover said predetermined open area of said container to fully cover said simply connected area, said porous sheet defining a plurality of elements that form at least a plurality of apertures dimensioned to prevent an adult mosquito from passing therethrough but allowing evaporation of standing water placed into said container and passage of water molecules through said plurality of apertures; and
   a sticky substance on outwardly facing surfaces of said plurality of elements of the entire porous sheet extending across said entire periphery of said container;
   whereby water placed and retained over an extended period of time within said container attains an upper surface substantially equal to said predetermined simply connected area below said porous sheet of material maximizes, for a bottom wall having said predetermined simply connected area, the release of water molecules through said apertures into the atmosphere above said porous sheet without significant condensation on said porous sheet to attract gestating mosquitoes that attempt to enter said container to lay their eggs in the standing water below said porous sheet and are immobilized when retained by contact with said sticky substance and prevented from reaching the water and laying eggs in the water in said container or subsequently in any other body of water thereby breaking the reproductive cycle of the mosquito.

2. A device as defined in claim 1, wherein said side wall includes a flange or lip generally parallel to said bottom wall for cooperating with said attaching means.

3. A device as defined in claim 2 wherein said flange or lip extends outwardly substantially about said entire periphery.

4. A device as defined in claim 1, wherein said attaching means comprises a sheet of double-side tape one side of which adheres to said periphery of said container and the other side of which adheres to said porous sheet.

5. A device as defined in claim 1, wherein said attaching means comprises mechanical means for attaching said porous sheet to said container.

6. A device as defined in claim 5, wherein said mechanical means comprise a spring clip.

7. A device as defined in claim 1, wherein said porous sheet comprises a sheet of foraminous material.

8. A device as defined in claim 7, wherein said sheet comprises a porous screen.

9. A device as defined in claim 7, wherein said sheet comprises a wire mesh.

10. A device as defined in claim 1, wherein said container is part of a kit that also includes said porous sheet of material, said attaching means, said sticky substance and assembly and use instructions.

11. A device as defined in claim 1, wherein said container comprises a generally shallow rectangular box.

12. A device as defined in claim 1, wherein said sticky substance includes mussel-nimetic polymer.

13. A device as defined in claim 1, wherein the adhesive strength of said sticky substance is at least 100 kPa.

14. A device as defined in claim 1, wherein said container has a height between said bottom wall and said open area which is less than the dimensions of said bottom wall.

15. A device as defined in claim 14, wherein said container is rectangular and said height is less than half of the dimensions of said bottom wall.

16. A device for interrupting the gestation cycle of mosquitoes consisting of;
    a substantially leak-proof container that can be collapsed for shipping and storage and expanded for use and having a predetermined periphery defining a predetermined simply connected area within a horizontal plane when said container is placed on a horizontal surface, said container having a substantially uniform cross-section along a vertical axis corresponding to said predetermined simply connected area, an integral bottom wall and a side wall defining an internal volume for receiving and retaining water, said side wall defining an upper open predetermined area defined by said periphery substantially corresponding to said simply connected cross-sectional area;
    a generally porous sheet of material at least as large as said predetermined open area initially separable from said container for exposing said open area and allowing water to be freely poured into said container through said open area;
    attaching means for attaching said porous sheet to said container to entirely cover said predetermined open area of said container after water has been poured into said container, said porous sheet defining an outer surface when attached to said container along said periphery and having at least a plurality of apertures dimensioned to prevent an adult mosquito from passing therethrough, but allowing evaporation of standing water placed into said container and passage of water molecules through said plurality of apertures; and
    a sticky substance on said outer surface of said porous sheet extending across said entire periphery of said container;
    whereby water placed and retained over an extended period of time within said container attains an upper surface substantially equal to said predetermined simply connected area below said porous sheet of material to maximize, for a bottom wall having said predetermined simply connected area, the release of water molecules through said apertures into the atmosphere above said porous sheet to attract gestating mosquitoes that attempt to enter said container to lay their eggs in the standing water below said porous sheet and are immobilized when retained by contact with said sticky substance and prevented from reaching the water and laying eggs in the water in said container or subsequently in any other body of water thereby breaking the reproductive cycle of the mosquito.

17. A device as defined in claim 16, wherein said container, porous sheet of material and attaching means together form a kit to be assembled by an end user.

18. A device for interrupting the gestation cycle of mosquitoes consisting of;
    a substantially leak-proof generally shallow container having a predetermined periphery defining a predetermined imply connected area within a horizontal plane when said container is placed on a horizontal surface, said container having a substantially uniform cross-section along a vertical axis corresponding to said predetermined simply connected area, an integral bottom wall and a side wall defining an internal volume for receiving and retaining water, said side wall defining a predetermined upper open area defined by said periphery substantially corresponding to said simply connected cross-sectional area;
    a generally porous sheet of material at least as large as said predetermined open area;
    attaching means for attaching said porous sheet to said container to entirely cover said predetermined open area at said upper open area of said container, said porous sheet forming a non-solid area defining a plurality of outer surface elements when attached to said container along said periphery and having at least a plurality of apertures dimensioned to prevent an adult mosquito from passing therethrough, but allowing evaporation of standing water placed into said container and passage of water molecules vertically up through said plurality of apertures substantially without condensation on said outer surface elements; and
    a sticky substance on outwardly facing surfaces of said outer surfaces elements of the entire porous sheet extending across said entire periphery of said container;
    whereby water placed and retained over an extended period of time within said container attains an upper surface substantially equal to said predetermined simply connected area below said porous sheet of material to maximize, for a bottom wall having said predetermined simply connected area the release of water molecules vertically upwardly through said apertures over said predetermined area into the atmosphere above said porous sheet to attract gestating mosquitoes that attempt to enter said container to lay their eggs in standing water below said porous sheet and are immobilized when retained by contact with said sticky substance and prevented from reaching the water and laying eggs in the water in said container or subsequently in any other body of water thereby breaking the reproductive cycle of the mosquito.

19. A device as defined in claim 18, wherein said container has a height between said bottom wall and said open area which is less than the dimensions of said bottom wall.

20. A device as defined in claim 19, wherein said container has a height between said bottom wall and said open area which is less than dimensions of said bottom wall.

* * * * *